US012122112B2

(12) United States Patent
Van Beek et al.

(10) Patent No.: US 12,122,112 B2
(45) Date of Patent: Oct. 22, 2024

(54) BEAD-APEX STITCHING DEVICE AND METHOD FOR STITCHING AN APEX TO A BEAD

(71) Applicant: VMI Holland B.V., Epe (NL)

(72) Inventors: Willem Marinus Van Beek, Epe (NL); Timen Anton Van Werven, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/285,355

(22) PCT Filed: Mar. 17, 2022

(86) PCT No.: PCT/NL2022/050144
§ 371 (c)(1),
(2) Date: Oct. 2, 2023

(87) PCT Pub. No.: WO2022/211615
PCT Pub. Date: Oct. 6, 2022

(65) Prior Publication Data
US 2024/0190094 A1    Jun. 13, 2024

(30) Foreign Application Priority Data

Apr. 1, 2021 (NL) ....................................... 2027903
Jul. 8, 2021 (NL) ....................................... 2028663

(51) Int. Cl.
*B29D 30/48* (2006.01)
(52) U.S. Cl.
CPC ........ *B29D 30/48* (2013.01); *B29D 2030/482* (2013.01)

(58) Field of Classification Search
CPC .............. B29D 30/48; B29D 2030/482; B29D 2030/487
See application file for complete search history.

(56) References Cited

U.S. PATENT DOCUMENTS

| 4,004,961 A | * | 1/1977 | Takasuga | ................ | B29D 30/28 |
| | | | | | 91/405 |
| 4,990,212 A | | 2/1991 | Pizzorno | ................ | B29D 30/48 |

(Continued)

FOREIGN PATENT DOCUMENTS

| CN | 104105591 | 10/2014 | ............. B29D 30/00 |
| CN | 109483925 | 3/2019 | ............. B29D 30/28 |

(Continued)

OTHER PUBLICATIONS

Chinese Office Action issued in CN202210348407.8, dated Jan. 5, 2024, with machine English translation, 11 pgs.

(Continued)

*Primary Examiner* — Christopher M Rodd
*Assistant Examiner* — Shibin Liang
(74) *Attorney, Agent, or Firm* — HAYES SOLOWAY P.C.

(57) ABSTRACT

A bead-apex stitching device, a bead-apex station and a method for stitching an apex to a bead are disclosed, wherein the bead-apex stitching device includes a first set of first stitching members distributed in a circumferential direction about a central axis for stitching the apex to the bead and a second set of second stitching members for stitching the apex to the bead in a manner different from the first stitching members of the first set, wherein the second stitching members of the second set are distributed in an alternating pattern with the first stitching members of the first set in the circumferential direction.

30 Claims, 6 Drawing Sheets

(56) References Cited

U.S. PATENT DOCUMENTS

| | | | | |
|---|---|---|---|---|
| 5,100,497 | A | 3/1992 | Moody et al. | B29D 30/48 |
| 5,203,938 | A | 4/1993 | Moody et al. | B29D 30/50 |
| 6,363,988 | B1 | 4/2002 | Yasufuku et al. | B29D 30/48 |
| 8,585,845 | B2 * | 11/2013 | Weaver | B29D 30/36 156/402 |
| 10,137,654 | B2 * | 11/2018 | Slot | B29D 30/48 |
| 2007/0256790 | A1 | 11/2007 | Nijhuis | |
| 2015/0014121 | A1 | 1/2015 | Slot et al. | B29D 30/00 |
| 2020/0156339 | A1 | 5/2020 | Sasaki | B29D 30/48 |

FOREIGN PATENT DOCUMENTS

| | | | | |
|---|---|---|---|---|
| CN | 111186157 | | 5/2020 | B29D 30/48 |
| CN | 218342890 | | 1/2023 | B29D 30/48 |
| DE | 1129684 | | 11/1959 | B29H 17/12 |
| EP | 0345633 | | 6/1988 | B29D 30/48 |
| EP | 0466924 | | 1/1992 | B29D 30/48 |
| GB | 126111 | | 11/1918 | |
| GB | 1468717 | * | 3/1977 | B29H 17/32 |
| JP | 4826870 | | 4/1973 | |
| JP | 48101467 | | 12/1973 | |
| JP | 243029 | | 2/1990 | B29D 30/48 |
| JP | 8142227 | | 6/1996 | B29D 30/48 |
| JP | 11227068 | | 8/1999 | B29D 30/30 |
| JP | 2000355056 | | 12/2000 | B29D 30/48 |
| JP | 2017039255 | | 2/2017 | B29D 30/32 |
| WO | 2001017762 | * | 3/2001 | B29D 30/48 |
| WO | WO2022211615 | | 10/2022 | B29D 30/48 |

OTHER PUBLICATIONS

International Search Report, Written Opinion and International Preliminary Report on Patentability issued in PCT/NL2022/050144, dated Jun. 10, 2022, 16 pages.

Decision issued Japanese Patent Application 2022-546460, dated Sep. 29, 2023, with translation, 5 pages.

\* cited by examiner

BEAD-APEX STITCHING DEVICE AND METHOD FOR STITCHING AN APEX TO A BEAD

BACKGROUND

The invention relates to a bead-apex stitching device, a bead-apex station and a method for stitching an apex to a bead.

EP 1755874 B1 discloses a pressing station with a plurality of circumferentially spaced apart presser members mounted for radial movement to press the annular base portion of an apex to a bead core ring. The presser members may be provided with roller means resiliently mounted by spring means at the free end of each presser member.

The same document further discloses alternative pressing means in the form of a rotatable presser mechanism with an arm that is rotatable in the circumferential direction and a presser wheel at the end of said are which, upon rotation, presses the tapering portion of the apex against the bead ring.

SUMMARY OF THE INVENTION

A disadvantage of the known pressing station is that it is difficult to stitch the apex to the bead in a way in which the resulting bead-apex is both smooth and properly joined. When the presser member is pressed hard, the apex is strongly stitched to the bead, but the resulting bead-apex is not smooth or uniform. When the presser member is pressed softly, the resulting bead-apex is smooth and uniform, but the apex is not properly stitched to the bead.

It is an object of the present invention to provide a bead-apex stitching device, a bead-apex station and a method for stitching an apex to a bead, in which the quality of the stitching, both in terms of smoothness or uniformness and strength, can be improved.

According to a first aspect, the invention provides a bead-apex stitching device for stitching an apex to a bead, wherein the bead-apex stitching device comprises a first set of first stitching members distributed in a circumferential direction about a central axis for stitching the apex to the bead and a second set of second stitching members for stitching the apex to the bead in a manner different from the first stitching members of the first set, wherein the second stitching members of the second set are distributed in an alternating pattern with the first stitching members of the first set in the circumferential direction.

The use of two set of stitching members that stitch the apex to the bead in a different manner allows for the stitching members of each set to be optimized for their specific purpose. In particular, the stitching members of one of the sets can be designed to stitch the apex to the bead with a pressure that is evenly distributed over a larger area of the apex, to obtain a smooth and/or uniform bead-apex, while the stitching members of t the other set may be specifically designed to exert a relatively high, localized or concentrated pressure on the apex where it is most needed, i.e. at the base of the apex where it should be strongly adhered to the bead. Hence, after using both sets of stitching members, the resulting bead-apex can have an apex that is strongly adhered to the bead, while the bead-apex is still relatively smooth and/or uniform. The alternating pattern allows for the stitching members of both sets to be distributed in the circumferential direction without interfering with the operation of the stitching members of the other set.

Preferably, the first stitching members are different in shape or function to the second stitching members. The shape of the stitching members can determine the way the pressure exerted by the respective rollers on the apex is distributed over said apex.

More preferably, each first stitching member of the first set comprises a roller body that defines an obtuse pressing surface. The obtuse pressing surface is more likely to distribute the pressure force exerted by the first stitching member on the apex over a larger surface area, thus resulting in a more smooth or uniform bead-apex after the stitching.

Additionally or alternatively, each second stitching member of the second set comprises a roller body that defines a pointy pressing surface. The pointy pressing surface is more likely to generate a relatively high, local or concentrated pressure force on the apex, thus resulting in a strong adherence of the apex to the bead.

In a further embodiment each first stitching member of the first set is rotatable about a first roller axis and each second stitching member of the second set is rotatable about a second roller axis, wherein the first roller axis and the second roller axis are in different orientations relative to the central axis. The orientation of the stitching members can determine the predominant direction in which the pressure is exerted by the respective stitching members onto the apex.

Preferably, the first roller axis for each first stitching member extends within a first orientation range of seventy to one-hundred-and-ten degrees to the central axis. Hence, the first stitching members can roll in the circumferential direction along a radial or substantially radial plane with respect to the central axis and exert a pressure force onto the apex in a direction parallel to said central axis. As such, the first stitching members can smooth out irregularities in the apex to provide a smoother and/or more uniform bead-apex.

Additionally or alternatively, the second roller axis for each second stitching member extends within a second orientation range of zero to sixty degrees to the central axis. Hence, the second stitching members can roll in the circumferential direction along a cylindrical plane about the central axis and exert a pressure force onto the apex in a direction that is predominantly pointing radially inwards, i.e. towards the central axis. As such, the second stitching members can strongly press the base of the apex onto the bead.

In a further embodiment the first set comprises at least three first stitching members. Each first stitching member can stitch a respective circumferential section of the apex to the bead. With more first stitching members, the circumferential sections can be smaller, thus allowing for the entire circumference of the apex to be stitched to the bead with a limited relative rotation between the first stitching members and the apex.

In a further embodiment the second set comprises at least three second stitching members. Each second stitching member can stitch a respective circumferential section of the apex to the bead. With more second stitching members, the circumferential sections can be smaller, thus allowing for the entire circumference of the apex to be stitched to the bead with a limited relative rotation between the second stitching members and the apex.

In a further embodiment the first stitching members are evenly distributed in the circumferential direction. The first stitching members can thus be spaced apart equally, i.e. at equiangular distances. Again a limited relative rotation equal to a single angular interval between the first stitching members and the apex is sufficient to stitch the entire circumference of the apex.

In a further embodiment the second stitching members are evenly distributed in the circumferential direction. The second stitching members can thus be spaced apart equally, i.e. at equiangular distances. Again a limited relative rotation equal to a single angular interval between the second stitching members and the apex is sufficient to stitch the entire circumference of the apex.

In a further embodiment the first set is rotatable as a whole about the central axis. Hence, the first stitching members of the first set can be rotated as one or in unison. The relative position between the first stitching members within the first set can remain the same. More in particular, the first stitching members can all be driven by a single drive. Preferably, the first set and the second set are rotatable together. Hence, the first set and the second set can be rotated as one or in unison. The relative position between the first stitching members and the second stitching members can remain the same. More in particular, the first stitching members and the second stitching members can all be driven by a single drive.

In a further embodiment the bead-apex stitching device comprises a stitching drive for driving the rotation of the first set about the central axis and a control unit that is operationally connected to the stitching drive, wherein the control unit is configured for controlling the stitching drive to rotate the first set in a first rotation 20 direction over a first rotation range and to subsequently rotate the first set in a second rotation direction, opposite to the first rotation direction, over a second rotation range. By rotating the first set back-and-forth, the first set can be returned to its initial position and is immediately ready for a subsequent stitching operation. Hence, the cycle time of the bead-apex stitching device can be reduced considerably.

In a further embodiment the first rotation range and/or the second rotation range are less than one revolution. In this manner, it can be prevented that control lines, such as electric cables and pneumatic tubes, get entangled. A small rotation range can also further reduce the cycle time.

In a further embodiment thereof the first stitching members of the first set are spaced apart the circumferential direction over equal angular intervals, wherein the first rotation range is more than one time the angular interval. Consequently, the circumferential section of the apex that is stitched by a respective one of the first stitching members overlaps with the circumferential section of the apex already stitched by another one of the first stitching members, ensuring that the entire circumference of the apex is stitched.

Preferably, the first rotation range in the first rotation direction comprises a start subrange, a middle subrange and an end subrange, wherein the control unit is further configured for controlling one or more parameters of the group comprising angular velocity and pressure, wherein the control unit is configured for keeping the one or more parameters constant or substantially constant in the middle subrange and for increasing and decreasing the one or more parameters in the start subrange and the end subrange, respectively. The start range and the end range can be effectively used to start or stop the stitching and ensure that the parameters, at least in the middle subrange, are constant. Hence, a smooth and/or uniform bead-apex can be obtained.

In a further embodiment the first stitching members of the first set and the second stitching members of the second set are movable in a radial direction perpendicular to the central axis. Hence, the radial position of the stitching members can be adjusted to account for various diameters of beads, apexes or bead-apexes or to affect the location where the apex is pressed with the higher pressure.

In a further embodiment the bead-apex stitching device further comprises one or more actuators for pressing one or more stitching members of the group comprising the first stitching members and the second stitching members onto the apex with a controlled pressure. The pressure can for example be controlled in accordance with the subranges specified above. Moreover, the pressure level can b adjusted, for example based on compounds and/or recipe.

Alternatively, the bead-apex stitching device further comprises one or more biasing members for biasing the one or more stitching members of the group comprising the first stitching members and the second stitching members to press onto the apex. The one or more biasing members, i.e. springs, can be used to passively bias the stitching members in a way that is less complex to the aforementioned, actively controlled actuators.

In a further embodiment each first stitching member of the first set is rotatable about a first roller axis and positionable at a tilt angle about a tilt axis perpendicular to the first roller axis into a tilted orientation in which the first roller axis does not intersect with the central axis. In the tilted orientation, the rolling direction of the first stitching members can be slightly misaligned with respect to the circumferential direction, thereby causing the first stitching members to exert a sideward force onto the apex that can effectively smooth out irregularities in said apex. The first stitching members may be actively tilted into the tilted orientation, or they may be installed in said tilted orientation. The tilt angle preferably remains constant. Alternatively, it may be actively controlled and/or varied during stitching.

In a further embodiment one set of the group comprising the first set and the second set is retractable in a retraction direction into a standby position when the other set of the group comprising the first set and the second set is stitching the apex to the bead. Hence, it can be prevented that the operation of one set does interfere with the operation of the other set. Nevertheless, it is noted that the operations may partially overlap, i.e. one set may already be brought into position before the other set is retracted in the retraction direction. The latter may save cycle time and/or it may be beneficial to have the two sets contacting the apex simultaneously at least once during the cycle.

According to a second aspect, the invention provides a bead-apex station comprising the bead-apex stitching device according to any one of the embodiments according to the first aspect of the invention and a bead holder for holding the bead concentrically to the bead-apex stitching device. Preferably, the bead holder is rotatable in the circumferential direction about the central axis. In this scenario, the first stitching members and the second stitching members may remain stationary. Alternatively, the bead holder and the sets of stitching members may both be rotated in a coordinated fashion. In any case, a relative rotation between the bead holder and the sets of stitching members is generated.

More preferably, the bead station comprises a bead holder drive for driving the rotation of the bead holder and a control unit that is operationally connected to the bead holder drive, wherein the control unit is configured for controlling the bead holder drive to rotate the bead holder in a first rotation direction over a first rotation range and to subsequently rotate the bead holder in a second rotation direction, opposite to the first rotation direction, over a second rotation range. This has the same technical advantage as the previously discussed embodiment in which the sets of stitching members are being rotated.

More preferably, the first stitching members of the first set are spaced apart in the circumferential direction over equal angular intervals, wherein the first rotation range is more than one time the angular interval. This has the same technical advantage as the previously discussed embodiment in which the sets of stitching members are being rotated.

Most preferably, the first rotation range in the first rotation direction comprises a start subrange, a middle subrange and an end subrange, wherein the control unit is further configured for controlling the angular velocity of the bead holder, wherein the control unit is configured for keeping the angular velocity constant or substantially constant in the middle subrange and for increasing and decreasing the angular velocity in the start subrange and the end subrange, respectively. This has the same technical advantage as the previously discussed embodiment in which the sets of stitching members are being rotated.

According to a third aspect, the invention provides a method for stitching an apex to a bead using the bead-apex stitching device according to any one of the embodiments according to the first aspect of the invention, wherein the method comprises the steps of:
 a) first stitching the apex to the bead using the first stitching members of the first set; and
 b) subsequently stitching the apex to the bead using the second stitching members of the second set.

Preferably, step a) involves rotating the first set in a first rotation direction about the central axis over a first rotation range, wherein step b) involves rotating the first set in a second rotation direction, opposite to the first rotation direction, over a second rotation range.

The method according to the third aspect of the invention relates to the practical implementation of the bead-apex stitching device according to the first aspect of the invention and thus has the technical advantages, which will not be repeated hereafter.

According to a fourth aspect, the invention provides a method for stitching an apex to a bead using the bead-apex station according to any one of the embodiments according to the second aspect of the invention, wherein the method comprises the steps of:
 a) first stitching the apex to the bead using the first stitching members of the first set while rotating the bead holder in a first rotation direction over a first rotation range of less than one revolution; and
 b) subsequently stitching the apex to the bead using the second stitching members of the second set while rotating the bead holder in a second rotation direction, opposite to the first rotation direction, over a second rotation range of less than one revolution.

The method according to the fourth aspect of the invention relates to the practical implementation of the bead-apex station according to the second aspect of the invention and thus has the technical advantages, which will not be repeated hereafter.

According to a fifth, unclaimed aspect, the invention provides a bead-apex stitching device for stitching an apex to a bead, wherein the bead-apex stitching device comprises at least one first stitching member for stitching the apex to the bead and at least one second stitching member for stitching the apex to the bead in a manner different from the first stitching member, wherein the at least one first stitching member and the at least one second stitching member together are rotatable in a circumferential direction about a central axis, wherein the bead-apex stitching device comprises a stitching drive for driving the rotation of the at least one first stitching member and the at least one second stitching member about the central axis and a control unit that is operationally connected to the stitching drive, wherein the control unit is configured for controlling the stitching drive to rotate the at least one first stitching member and the at least one second stitching member in a first rotation direction and to subsequently rotate the at least one first stitching member and the at least one second stitching member in a second rotation direction, opposite to the first rotation direction.

By rotating the first set back-and-forth, it can be prevented that control lines, such as electric cables and pneumatic tubes, get entangled.

It will be clear that any embodiments of the previously discussed aspects of the invention can be combined with bead-apex stitching device according to the fifth aspect of the invention.

The various aspects and features described and shown in the specification can be applied, individually, wherever possible. These individual aspects, in particular the aspects and features described in the attached dependent claims, can be made subject 41 of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
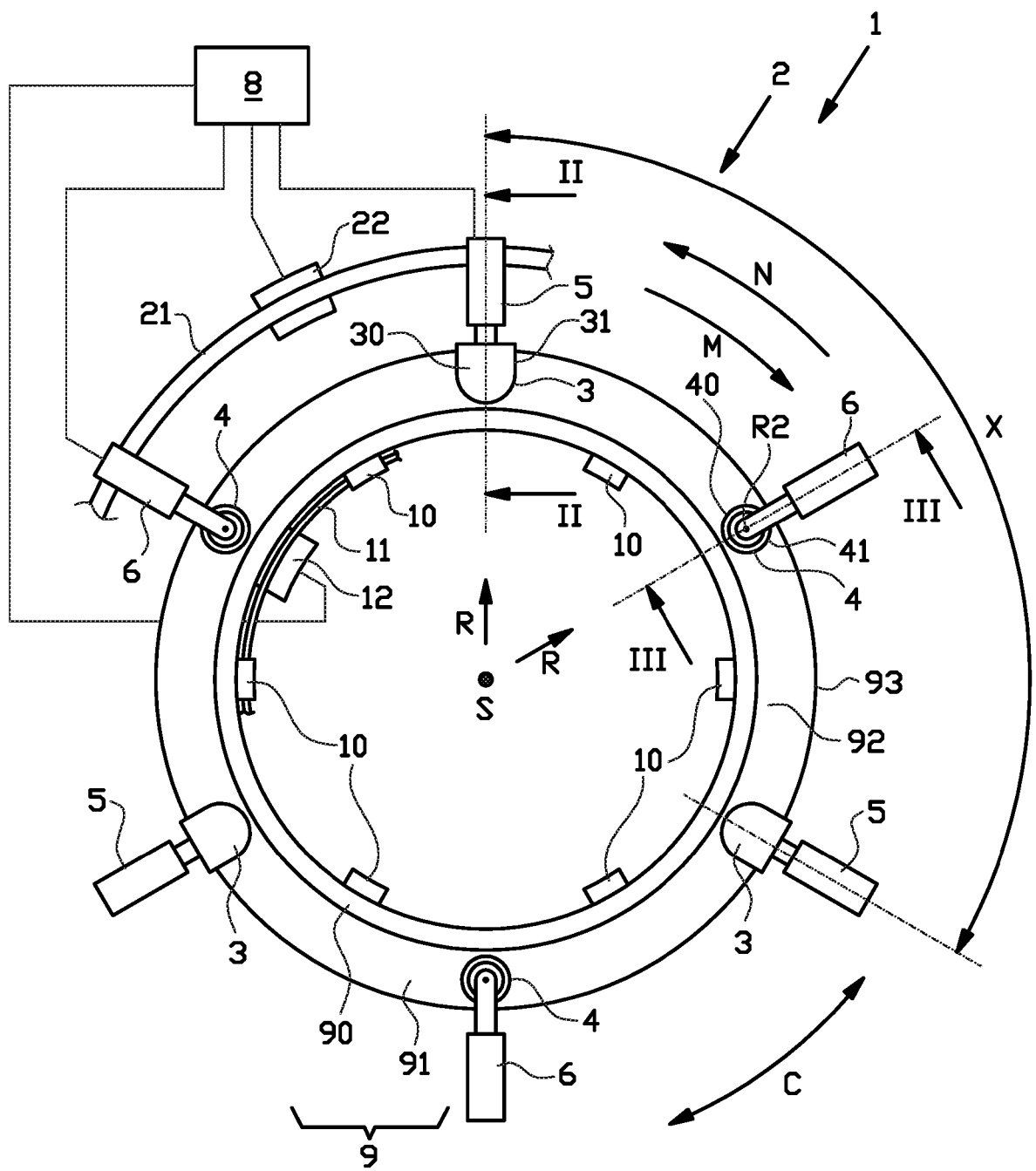
FIG. 1 shows a front view of a bead-apex station with a bead-apex stitching device according to a first embodiment of the invention.
Figure 6:
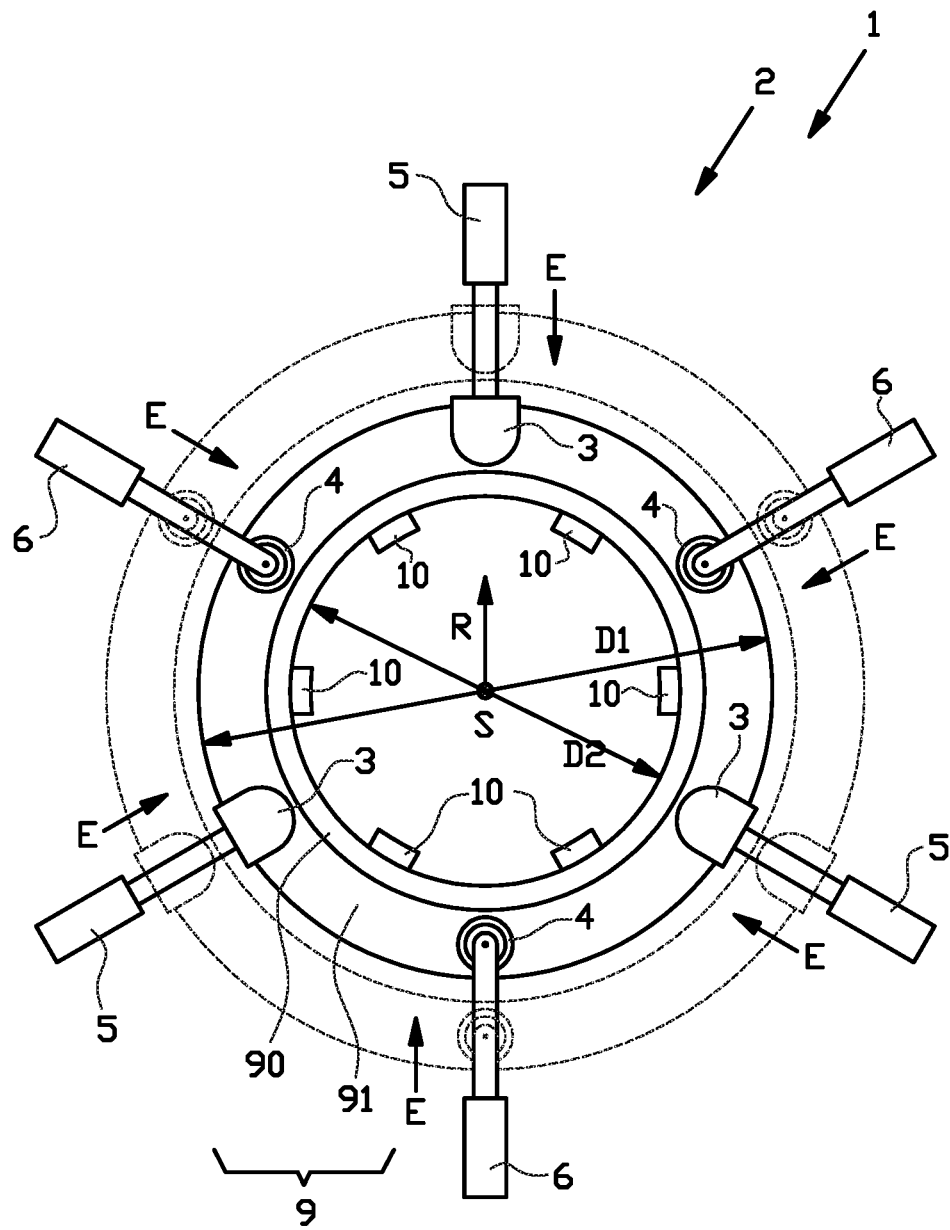
FIG. 6 shows a front view of the bead-apex station adjusted to a smaller diameter bead-apex compared to the bead-apex in FIG. 1.
Figure 7:
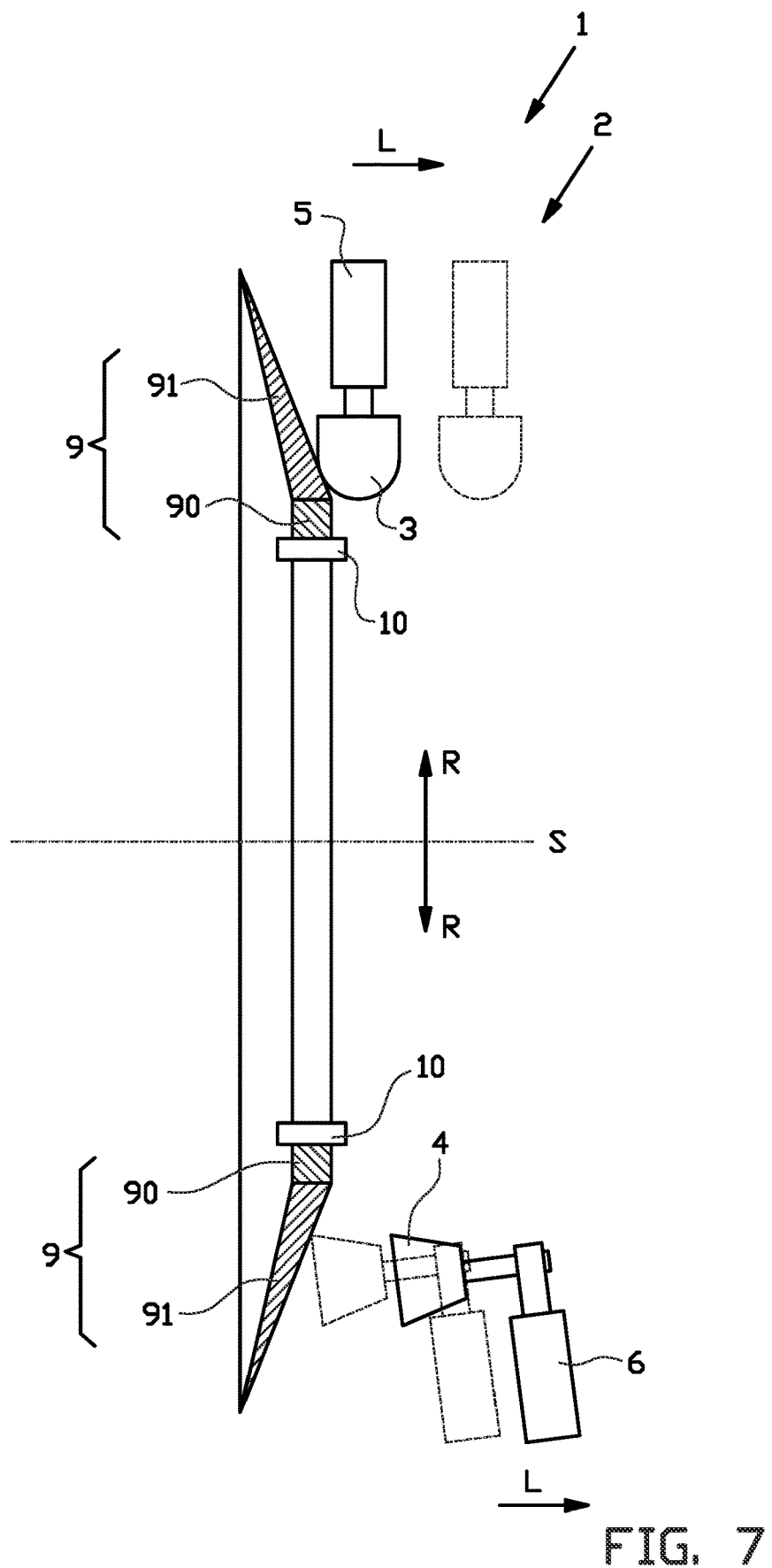
FIG. 7 shows a side view in cross section of the bead-apex station according to FIG. 1.
Figure 8:
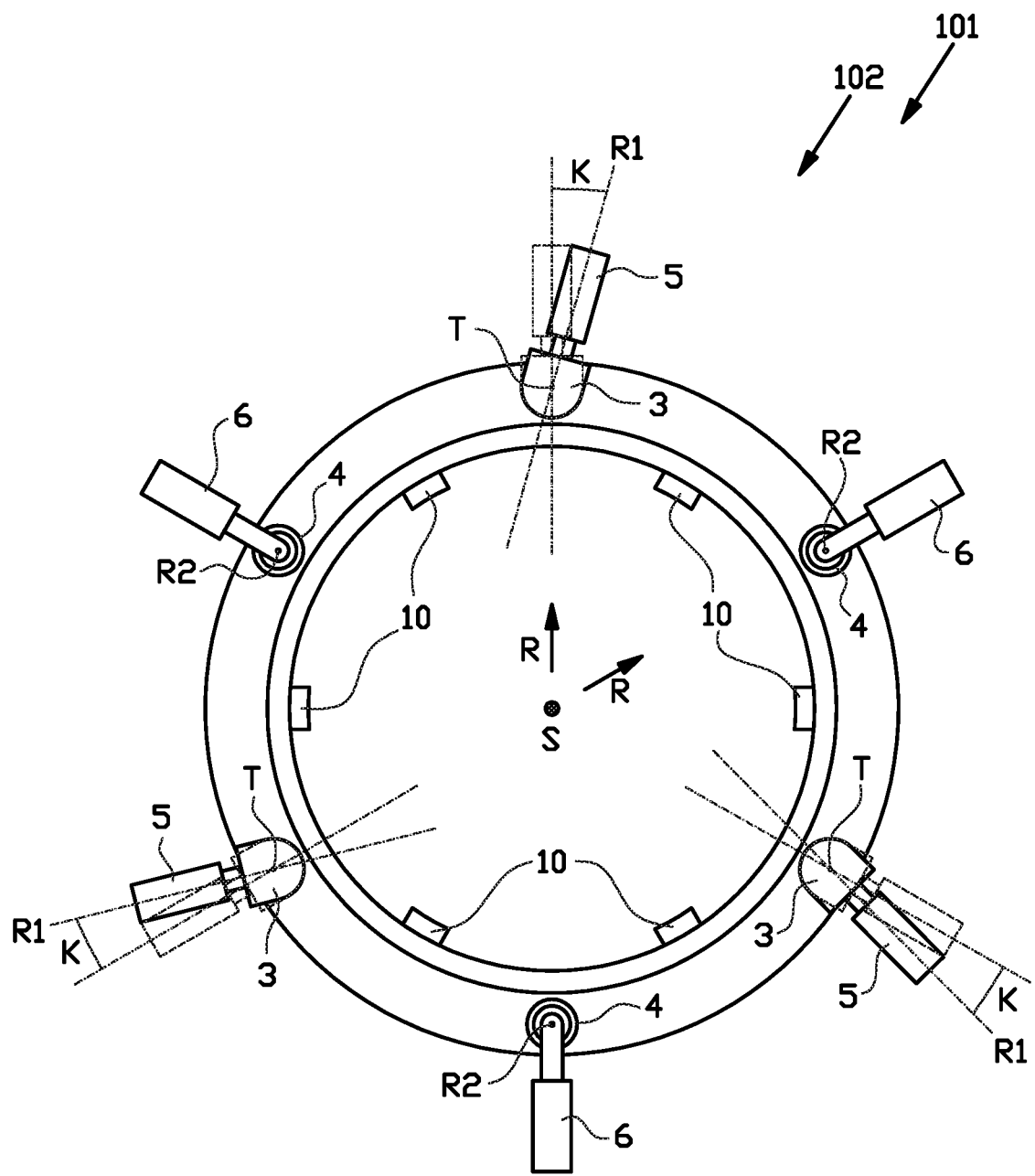
FIG. 8 shows a front view of an alternative bead-apex station with an alternative bead-apex stitching device according to a second embodiment of the invention.

FIGS. 1, 6 and 7 show a bead-apex station 1 according to a first exemplary embodiment of the invention. The bead-apex station 1 may be an individual station, or part of a multi-station tire building machine, such as a turret (not shown), known per se.

The bead-apex station 1 comprises one or more bead holders 10 for holding a bead core or bead 90 in an annular or ring-shaped configuration about a central axis S. An elastomeric filler or apex is, or has been, applied concentrically around the bead 90. The bead-apex station 1 is configured for pressing or stitching the apex 91 onto the bead 90 to form a so-called bead-apex 9. The bead-apex 9 can be used in subsequent stages of tire building to form a green or unvulcanized tire. In this exemplary embodiment, the bead-apex station 1 comprises a bead holder frame 11 for carrying the one or more bead holders 10 and a bead holder drive 12 for driving the one or more bead holders 10 and/or the bead holder frame 11 in a rotation about the central axis S.

Figure 2:
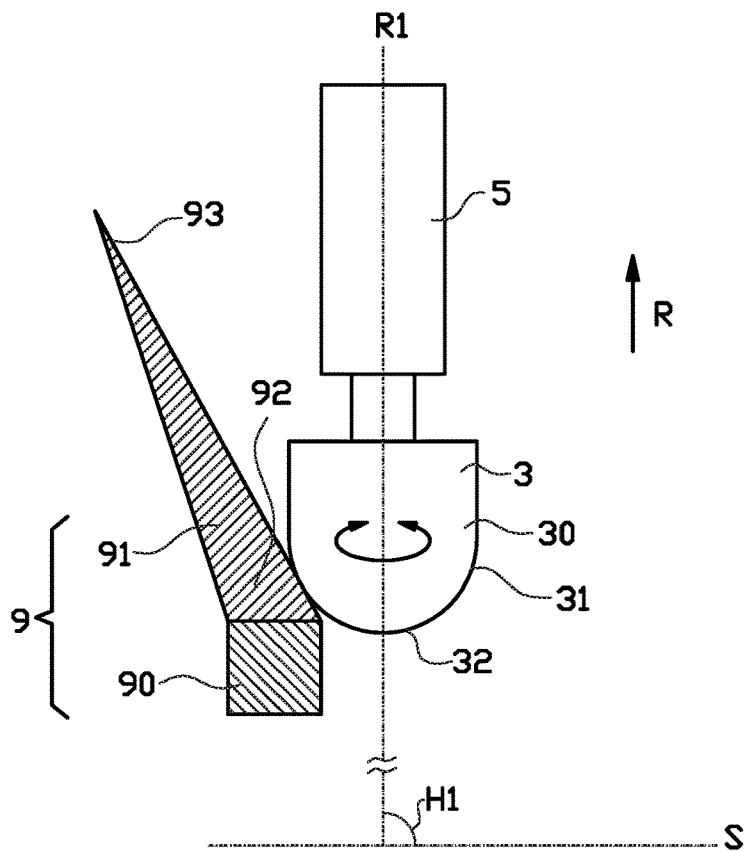
FIGS. 2 and 3 show cross sections of the bead-apex stitching device according to line II-II and line III-III, respectively, in FIG. 1.
Figure 3:
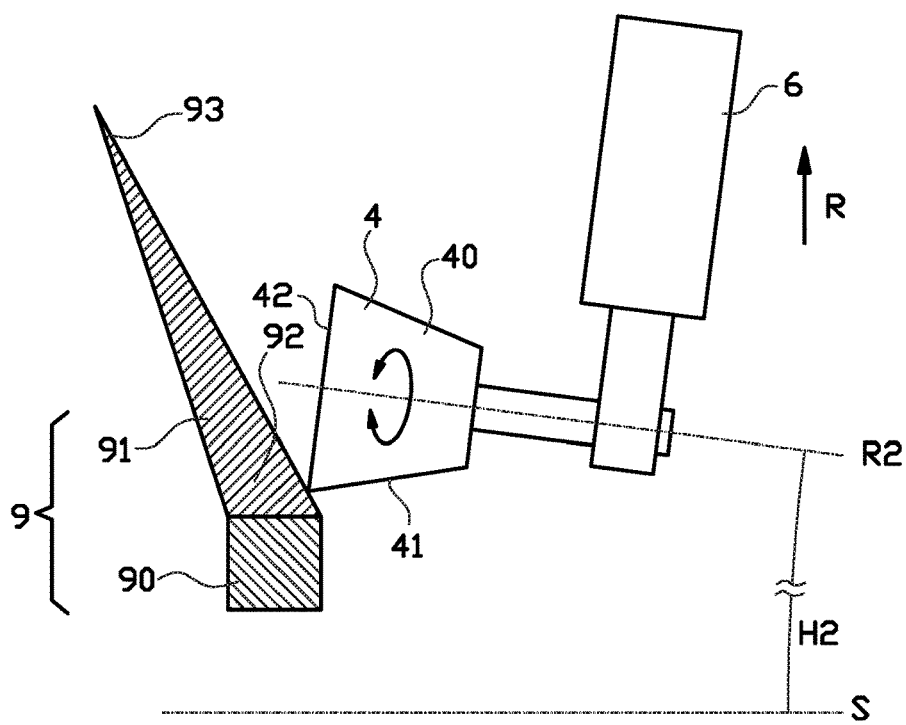

As best seen in FIGS. 2 and 3, the apex 91 has a body with a triangular cross section that defines a base 92 and a tip 93. The apex 91 is applied with the base 92 around the bead 90.

As shown in FIG. 1, the bead-apex station 1 further comprises a bead-apex stitching device 2 for stitching the apex 91 onto the bead 90. The bead-apex stitching device 2 comprises a first set of first stitching members 3, in particular first rollers 3, distributed in a circumferential direction C about the central axis S. The first stitching members 3 may alternatively be formed by another suitable stitching means, such as brushes, pads, fingers, spoons or the like. Each first roller 3 is rotatable about a respective first roller axis R1. In this exemplary embodiment, the first set consists of three first rollers 3, although an embodiment with two first rollers 3 or more than three first rollers 3 is also considered to be within the scope of the present invention. Preferably, the first rollers 3 are evenly distributed, i.e. spaced apart equiangularly and/or at a fixed angular interval X. In this particular example, the first rollers 3 are spaced apart over an angular interval X of one-hundred-and-twenty degrees.

The bead-apex station 2 further comprises a second set of second stitching members 4, in particular second rollers 4. The first stitching members 3 may alternatively be formed by another suitable stitching means, such as brushes, pads, fingers, spoons or the like. In this example, the second stitching members 4 alternate with the first rollers 3 of the first set in the circumferential direction C. In other words, considered in the circumferential direction C, the bead-apex station 2 has a first set of stitching members 3 and a second set of stitching members 4 distributed in the circumferential direction C in an alternating pattern, i.e. a pattern consecutively comprising a repeating group of one of the first stitching members 3 and one of the second stitching members 4. Each second roller 4 is rotatable about a respective second roller axis R2. It will be understood that the considerations regarding the amount and distribution of the first rollers 3 apply mutatis mutandis to the second rollers 4.

The first rollers 3 and the second rollers 4 are designed, configured and/or arranged to press or stitch the apex 91 to the bead 90 in a different manner different. In other words, the first rollers 3 have a different purpose or function to the second rollers 4.

In this exemplary embodiment, the first rollers 3 are different in shape to the second rollers 4. In particular, as best seen in FIG. 2, each first roller 3 comprises a roller body 30 that defines an obtuse circumferential surface or pressing surface 31. Preferably, the obtuse pressing surface 31 transitions into a dome-shaped and/or tapering distal end 32. In contrast, as shown in FIG. 3, each second roller 4 comprises a roller body 40 that defines a pointy circumferential surface or pressing surface 41. In particular, the pressing surface 41 has a sharp or pointy transition to a surface that defines the distal end 42 of the respective second roller 4. In other words, the roller body 30 of the first roller 3 has a pressing surface 31 facing the apex 91 with a rounded or 'soft' contour, while the roller body 40 of the second roller 4 has a pressing surface 41 facing the apex 91 with a relatively sharp, distinct pressing edge.

It is also envisioned that the first rollers 3 and the second rollers 4 may have an identical shape having two sides used for the different purposes. For example, the rollers 3, 4 may be given an identical shape that has an obtuse side and a pointy side, thus requiring a mere reversal of the orientation of the rollers 3, 4 relative to the apex 91 to change the way in which the rollers 3, 4 press the apex 91. In such a case, the side of the rollers 3, 4 facing the apex 91 is considered the 'selected side' and the interpretation of the 'shape' of the rollers 3, 4 only applies to the 'selected side'.

The first rollers 3 are held in an orientation in which the respective first roller axes R1 are perpendicular or substantially perpendicular to the central axis S, i.e. within a first orientation range H1 of seventy to one-hundred-and-ten degrees to the central axis S. The second rollers 4 are held in a different orientation in which the respective second roller axes R2 are parallel or almost parallel to the central axis S. Alternatively, the second roller axes R2 may be positioned at a more inclined or oblique angle to the central axis S. 7. In any case, the second roller axes R2 extend within a second orientation range H2 of zero to sixty degrees to the central axis S. The difference in orientation between the roller axes R1, R2 contributes to the first rollers 3 and the second rollers 4 performing different stitching purposes.

In particular, the first rollers 3 can roll in the circumferential direction C along a radial or substantially radial plane with respect to the central axis S and exert a pressure force onto the apex 91 in a direction parallel to said central axis S. As such, the first rollers can smooth out irregularities in the apex 91 to provide a smoother and/or more uniform bead-apex 9. In contrast, the second rollers 4 can roll in the circumferential direction C along a cylindrical plane about the central axis S and exert a pressure force onto the apex 91 in a direction that is predominantly pointing radially inwards, i.e. towards the central axis S. As such, the second rollers 4 can strongly press the base 92 of the apex 91 onto the bead 90.

As shown in FIG. 6, each first roller 3 of the first set can be moved, driven, actuated and/or positioned with at least a vector component in a radial direction R perpendicular to the central axis S by a respective first actuator 5. Alternatively, each first roller 3 can be driven in a direction parallel to the central axis S. Similarly, each second roller 4 of the second set can be moved, driven, actuated and/or positioned with at least a vector component in the radial direction R by a respective second actuator 6. The second actuator 6 may be positioned at an oblique angle to the central axis S to move the corresponding second roller 4 at said oblique angle, i.e. in a range of ten to eighty degrees to said central axis S. Preferably, the first rollers 3 of the first set are all moved at the same time and to the same extent, i.e. synchronously or by a single actuator. Similarly, the second rollers 4 of the second set are all moved at the same time and to the same extent. The diameter adjustment of the first set and the second set may be independently controlled, i.e. the first rollers 3 may be controlled to move to a slightly different diameter than the second rollers 4, to press onto the apex 91 at a slightly different radius. Hence, the radial position of the rollers 3, 4 can be adjusted to match various diameters D1, D2 of the bead 90, the apex 91 or the bead-apex 9. The actuators 4, 5 may be linear drives such as pneumatic cylinders or a linear servo motor. It is however submitted that many alternative drive systems are envisioned that would yet be encompassed by the scope of the present invention. For example, the rollers 3, 4 of one or both sets may alternatively be driven in the radial direction R by a single actuator, i.e. a spiral drive, known per se.

The same actuators 5, 6 may also be used to actively control the pressure which is exerted by the rollers 3, 4 onto the apex 91. The pressure may be controlled for each roller 3, 4 independently or synchronously for all rollers 3, 4 of one set. The individual control may allow for an accurate tracking of the contour of the apex 91 by the individual rollers 3, 4. Alternatively, the rollers 3, 4 may be passively biased, spring-loaded or spring-biased, i.e. by providing the bead-apex stitching device 2 with one or more biasing members (not shown), such as springs.

As shown in FIG. 1, the bead-apex station 1 is configured for generating a relative rotation between the first rollers 3 of the first set and the bead-apex 9 in the circumferential direction C about the central axis S. This can be achieved in various ways. In this exemplary embodiment, the first set of rollers 3 is rotatable as a whole about the central axis S while the bead holder 10 remains stationary. The bead-apex stitching device 2 may comprise a stitching base or a stitching frame 21 for supporting or holding the first rollers 3 in a fixed mutual relationship and a stitching drive 22 that engages with the stitching frame 21 to rotate said stitching frame 21 in the circumferential direction C.

Alternatively, the one or more bead holders 10 may be rotated relative to the first set of rollers 3, or both the one or more bead holders 10 and the first set of rollers 3 may be rotated at the same time in opposite directions. The bead-apex station 1 may be provided with a bead holder base or bead holder frame 11 to support or hold the one or more bead holders 10 and a bead holder drive 12 to rotate said bead holder frame 11 in the circumferential direction C.

Preferably, the second set is rotated together with the first set. In other words, the first set and the second set are rotated in unison. Hence, the relative position between the first rollers 3 and the second rollers 4 in the circumferential direction C can remain the same during the rotation about the central axis S.

The bead-apex station 1 may optionally comprises a third set or further sets of stitching members (not shown) to perform other functions. The third set of stitching members may for example be positioned to press or stitch a transition area between the bead 90 and the apex 91, i.e. the area at the base 92 of the apex 91 and the directly adjacent area of the bead 90.

The bead-apex station 1 or the bead-apex stitching device 2 is further provided with a control unit 8 that is electronically or operationally connected to the bead holder drive 12, the stitching drive 22, the one or more first actuators 5 and/or the one or more second actuators 6 to control the various operations of the bead-apex station 1 and/or the bead-apex stitching device 2.

In this exemplary embodiment, the control unit 8 is programmed, loaded with instructions, adapted, arranged or configured for controlling the stitching drive 22 to rotate the first set in a first rotation direction M and to subsequently rotate the first set in a second rotation direction N, opposite to the first rotation direction M. In this example, the first set is preferably rotated over a first rotation range A of less than one revolution, i.e. less than three-hundred-and-sixty degrees, and over a second rotation range B of less than one revolution, i.e. less than three-hundred-and-sixty degrees. The first set may however also be rotated in opposite directions over one revolution or more than one revolution. The second set is rotated together or in unison with the first set. As mentioned before, the control unit 8 may alternatively be configured to rotate the bead holder 10 relative to the first set by controlling the bead holder drive 12.

During the rotation in the first rotation direction M, the first rollers 3 of the first set are controlled to press or stitch the apex 91 to the bead 90. During this stage of stitching, the second rollers 4 of the second set may be retracted in a retraction direction L, as shown in FIG. 7, so as not to interfere with the first rollers 3 of the first set. During or shortly prior to the opposite rotation in the second rotation direction N, the second rollers 4 of the second set are brought into contact with the apex 91 and the first rollers 3 of the first set may be retracted in the retraction direction L to allow for the subsequent stage of stitching. Hence, the stitching process can be split up in two distinct stages.

The retraction direction L of the first rollers 3 and the second rollers 4 is shown to be parallel or substantially parallel to the central axis S. Alternatively, the retraction direction L may be in the working direction of the respective actuators 5, 6, i.e. at an oblique angle to said central axis S or at a right angle to said central axis S. Hence, the actuators 5, 6 may be used to retract the respective rollers 3, 4. This can eliminate the need for a separate retraction drive.

By rotating the rollers 3, 4 of the sets back-and-forth in the opposing rotation directions M, N, the first set can be returned to its initial position and is immediately ready for a subsequent stitching operation. Hence, the cycle time of the bead-apex stitching device 2 can be reduced considerably. Moreover, it can be prevented that control lines, such as electric cables and pneumatic tubes, get entangled.

It is submitted however that if the combined stroke of the first set and the second set is small enough, i.e. if each set has a sufficient amount of the rollers to reduce the angular interval X, both stages may also be performed in the same rotation direction, i.e. following upon each other without reversing the rotation direction.

Figure 4:
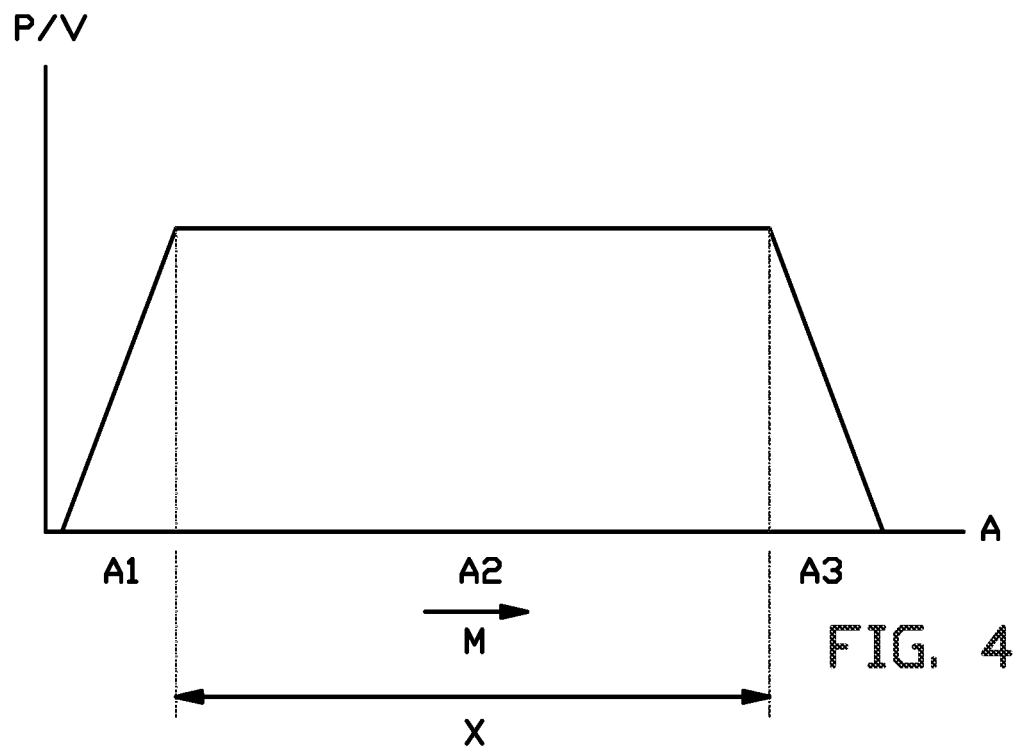
FIGS. 4 and 5 show control schemes for controlling the bead-apex stitching device to according FIG. 1.
Figure 5:
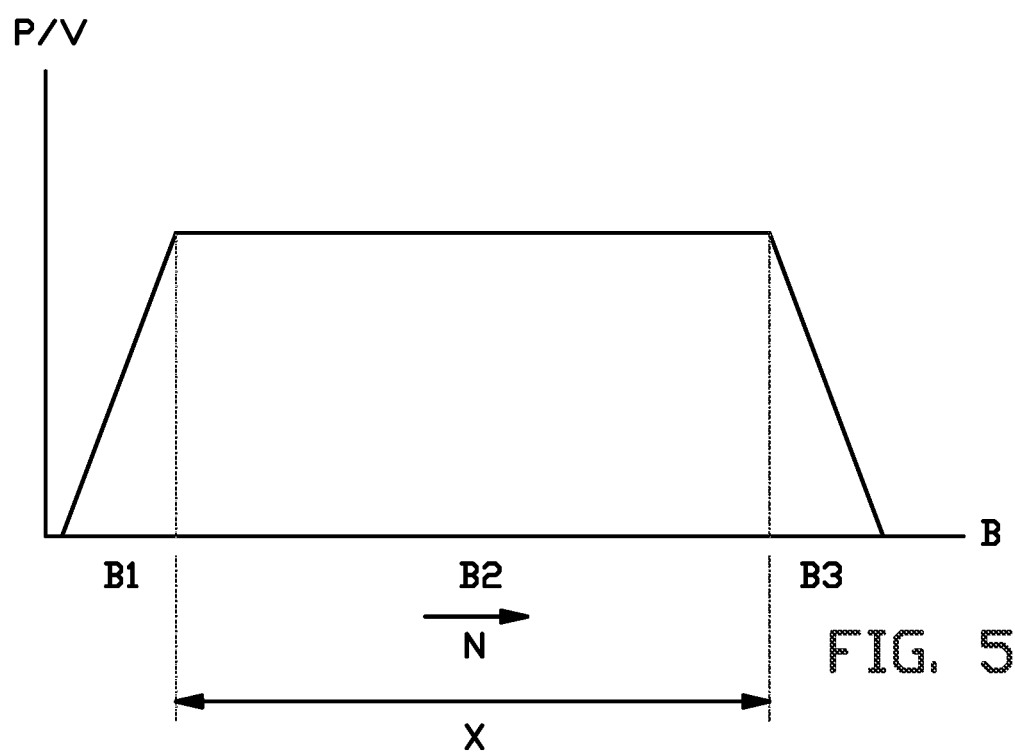

FIGS. 4 and 5 show control schemes of the first set being rotated in the first rotation direction M and the second set being rotated in the second rotation direction N, respectively. The horizontal axes represent the angular position of the first set and the second set along a first rotation range A and a second rotation range B, respectively. The vertical axes represent one or more parameters of first set and the second set, respectively, i.e. the angular velocity V of the respective set in the circumferential direction C or the pressure P exerted by the respective set onto the apex 91. In this exemplary embodiment, the rotation ranges A, B are larger than one time the angular interval X between the first rollers 3. Preferably, the rotation ranges A, B are smaller the two times said angular interval X. Alternatively, the rotation ranges A, B may be larger than two times said angular interval X to make sure that each area of the apex 91 is pressed by at least two rollers of the respective set. The excess range can be used to start up and slow down the sets. In particular, both ranges A, B comprise a plurality of subranges, more specifically a start subrange A1, B1, a middle subrange A2, B2 and an end subrange A3, B3. The control unit 8 is configured for keeping the one or more parameters P, V constant or substantially constant in the middle subrange A2 and for increasing and decreasing the one or more parameters P, V in the start subrange A1 and the end subrange A3, respectively.

As mentioned before, the same control schemes may be used to control the rotation of the bead holder 10 instead of or in addition to the rotation of the sets of rollers 3, 4.

FIG. 7 shows an alternative bead-apex station 101 with an alternative bead-apex stitching device 102 that differs from the aforementioned bead-apex stitching device 2 in that each first roller 3 of the first set is positionable at or tiltable towards a tilt angle K about a tilt axis T perpendicular to the first roller axis R1 and/or parallel to the central axis S into a tilted orientation in which the first roller axis R1 does not intersect with the central axis S. In the tilted orientation, the rolling direction of the first rollers 3 can be slightly misaligned with respect to the circumferential direction C, thereby causing the first rollers 3 to exert a sideward force, i.e. a friction force, onto the apex 91 that can effectively smooth out irregularities in said apex 91. The first rollers 3 may be actively tilted into said tilted orientation, or they may be installed in said tilted orientation. The tilt angle K preferably remains constant. Alternatively, it may be actively controlled and/or varied during stitching.

A method for stitching the apex 91 to the bead 90 using the aforementioned bead-apex station 1, 101 and/or the aforementioned bead-apex stitching device 2, 102 will be briefly elucidated hereafter with reference to FIGS. 1-8.

As shown in FIG. 1, the method comprises the steps of:
a) first stitching the apex 91 to the bead 90 using the first rollers 3 of the first set; and
b) subsequently stitching the apex 91 to the bead 90 using the second rollers 4 of the second set.

During step the first set is rotated in the first rotation direction M about the central axis S according to the control scheme in FIG. 4. During step b) the first set is rotated in the second rotation direction N according to the control scheme in FIG. 5. The second set is rotated together with the first set. During the control scheme in FIG. 4, the first set is active in the sense that the first rollers 3 are pressed onto the apex 91. During the control scheme of FIG. 5, the second set is active in the sense that the second rollers 4 are pressed onto the apex 91. The set that is inactive can be retracted in the retraction direction L, as shown in FIG. 7.

It is noted that the stages of the stitching may partially overlap, i.e. one set may already be brought into position before the other set is retracted in the retraction direction L. The latter may save cycle time and/or it may be beneficial to have the two sets contacting the apex 91 simultaneously at least once during the cycle.

The bead-apex station 1, 101 may comprise further drive means (not shown) for retracting the sets of rollers 3, 4 simultaneously in a direction parallel to the central axis S to allow for removal of the bead 90 and/or the apex 91.

As mentioned before, the bead holder 10 may be rotated instead of or in addition to the rotation of the first set. In that case, the method comprises the steps of:
a) first stitching the apex 91 to the bead 90 using the first rollers 3 of the first set while rotating the bead holder 10 in the first rotation direction M; and
b) subsequently stitching the apex 91 to the bead 90 using the second rollers 4 of the second set while rotating the bead holder 10 in the second rotation direction N.

It is further noted that the control unit 8 may control the various operational parameters of the bead-apex station 1, 101 and/or the bead-apex stitching device 2, 102 based on recipe, i.e. the materials, compounds or mixtures used to create the bead 90 and/or the apex 91, and/or based on the tire design, i.e. the construction, shape and/or dimensions of the various tire components and their relative position in the green tire to be formed.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 bead-apex station
10 bead holder
11 bead holder frame
12 bead holder drive
2 bead-apex stitching device
21 stitching frame
22 stitching drive
3 first stitching member
30 roller body
31 pressing surface
32 distal end
4 second stitching member
40 roller body
41 pressing surface
42 distal end
5 first actuator
6 second actuator
8 control unit
9 bead-apex
90 bead
91 apex
92 base
93 tip
101 alternative bead-apex station
102 alternative bead-apex stitching device
A first rotation range
A1 start subrange
A2 middle subrange
A3 end subrange
B second rotation range
B1 start subrange
B2 middle subrange
B3 end subrange
C circumferential direction
D1 first diameter
D2 second diameter
E extension direction
H1 first orientation range
H2 second orientation range
K tilt angle
L retraction direction
M first rotation direction
N second rotation direction
P pressure
R radial direction
R1 first roller axis
R2 second roller axis
S central axis
T tilt axis
V angular velocity
X angular interval

The invention claimed is:

1. A bead-apex stitching device for stitching an apex to a bead, wherein the bead-apex stitching device comprises a first set of first stitching members distributed in a circumferential direction about a central axis for stitching the apex to the bead and a second set of second stitching members for stitching the apex to the bead in a manner different from the first stitching members of the first set, wherein the second stitching members of the second set are distributed in an alternating pattern with the first stitching members of the first set in the circumferential direction.

2. The bead-apex stitching device according to claim 1, wherein the first stitching members are different in shape or function to the second stitching members.

3. The bead-apex stitching device according to claim 2, wherein each first stitching member of the first set comprises a roller body that defines an obtuse pressing surface.

4. The bead-apex stitching device according to claim 2, wherein each second stitching member of the second set comprises a roller body that defines a pointy pressing surface.

5. The bead-apex stitching device according to claim 1, wherein each first stitching member of the first set is rotatable about a first roller axis and each second stitching member of the second set is rotatable about a second roller axis, wherein the first roller axis and the second roller axis are in different orientations relative to the central axis.

6. The bead-apex stitching device according to claim 5, wherein the first roller axis for each first stitching member extends within a first orientation range of seventy to one-hundred-and-ten degrees to the central axis.

7. The bead-apex stitching device according to claim 5, wherein the second roller axis for each second stitching member extends within a second orientation range of zero to sixty degrees to the central axis.

8. The bead-apex stitching device according to claim 1, wherein the first set comprises at least three first stitching members.

9. The bead-apex stitching device according to claim 1, wherein the second set comprises at least three second stitching members.

10. The bead-apex stitching device according to claim 1, wherein the first stitching members are evenly distributed in the circumferential direction.

11. The bead-apex stitching device according to claim 1, wherein the second stitching members are evenly distributed in the circumferential direction.

12. The bead-apex stitching device according to claim 1, wherein the first set is rotatable as a whole about the central axis.

13. The bead-apex stitching device according to claim 12, wherein the first set and the second set are rotatable together.

14. The bead-apex stitching device according to claim 12, wherein the bead-apex stitching device comprises a stitching drive for driving the rotation of the first set about the central axis and a control unit that is operationally connected to the stitching drive, wherein the control unit is configured for controlling the stitching drive to rotate the first set in a first rotation direction over a first rotation range and to subsequently rotate the first set in a second rotation direction, opposite to the first rotation direction, over a second rotation range.

15. The bead-apex stitching device according to claim 14, wherein the first rotation range or the second rotation range are less than one revolution.

16. The bead-apex stitching device according to claim 14, wherein the first stitching members of the first set are spaced apart in the circumferential direction over equal angular intervals, wherein the first rotation range is more than one time the angular interval.

17. The bead-apex stitching device according to claim 16, wherein the first rotation range in the first rotation direction comprises a start subrange, a middle subrange and an end subrange, wherein the control unit is further configured for controlling one or more parameters of the group comprising angular velocity and pressure, wherein the control unit is configured for keeping the one or more parameters constant in the middle subrange and for increasing and decreasing the one or more parameters in the start subrange and the end subrange, respectively.

18. The bead-apex stitching device according to claim 1, wherein the first stitching members of the first set and the second stitching members of the second set are movable in a radial direction perpendicular to the central axis.

19. The bead-apex stitching device according to claim 1, wherein the bead-apex stitching device further comprises one or more actuators for pressing one or more stitching members of the group comprising the first stitching members and the second stitching members onto the apex with a controlled pressure.

20. The bead-apex stitching device according to claim 1, wherein the bead-apex stitching device further comprises one or more biasing members for biasing the one or more stitching members of the group comprising the first stitching members and the second stitching members to press onto the apex.

21. The bead-apex stitching device according to claim 1, wherein each first stitching member of the first set is rotatable about a first roller axis and positionable at a tilt angle about a tilt axis perpendicular to the first roller axis into a tilted orientation in which the first roller axis does not intersect with the central axis.

22. The bead-apex stitching device according to claim 1, wherein one set of the group comprising the first set and the second set is retractable in a retraction direction into a standby position when the other set of the group comprising the first set and the second set is stitching the apex to the bead.

23. A bead-apex station comprising the bead-apex stitching device according to claim 1 and a bead holder for holding the bead concentrically to the bead-apex stitching device.

24. The bead-apex station according to claim 23, wherein the bead holder is rotatable in the circumferential direction about the central axis.

25. The bead-apex station according to claim 24, wherein the bead-apex station comprises a bead holder drive for driving the rotation of the bead holder and a control unit that is operationally connected to the bead holder drive, wherein the control unit is configured for controlling the bead holder drive to rotate the bead holder in a first rotation direction over a first rotation range and to subsequently rotate the bead holder in a second rotation direction, opposite to the first rotation direction, over a second rotation range.

26. The bead-apex station according to claim 25, wherein the first stitching members of the first set are spaced apart in the circumferential direction over equal angular intervals, wherein the first rotation range is more than one time the angular interval.

27. The bead-apex station according to claim 26, wherein the first rotation range in the first rotation direction comprises a start subrange, a middle subrange and an end subrange, wherein the control unit is further configured for controlling the angular velocity of the bead holder, wherein the control unit is configured for keeping the angular velocity constant in the middle subrange and for increasing and decreasing the angular velocity in the start subrange and the end subrange, respectively.

28. A method for stitching an apex to a bead using the bead-apex stitching device according to claim 1, wherein the method comprises the steps of:
   a) first stitching the apex to the bead using the first stitching members of the first set; and
   b) subsequently stitching the apex to the bead using the second stitching members of the second set.

29. The method according to claim 28, wherein step a) involves rotating the first set in a first rotation direction about the central axis over a first rotation range, wherein step b) involves rotating the first set in a second rotation direction, opposite to the first rotation direction, over a second rotation range.

30. The method for stitching an apex to a bead using the bead-apex station according to claim 23 wherein the method comprises the steps of:
   a) first stitching the apex to the bead using the first stitching members of the first set while rotating the bead holder in a first rotation direction over a first rotation range of less than one revolution; and
   b) subsequently stitching the apex to the bead using the second stitching members of the second set while rotating the bead holder in a second rotation direction, opposite to the first rotation direction, over a second rotation range of less than one revolution.

* * * * *